US006574005B1

(12) United States Patent
Tomatsu

(10) Patent No.: US 6,574,005 B1
(45) Date of Patent: Jun. 3, 2003

(54) IMAGE FORMING APPARATUS

(75) Inventor: Yoshiya Tomatsu, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 633 days.

(21) Appl. No.: 09/028,449

(22) Filed: Feb. 24, 1998

(30) Foreign Application Priority Data

Feb. 28, 1997 (JP) ............................................. 9-045377

(51) Int. Cl.[7] ................................................ G06K 15/00

(52) U.S. Cl. ...................... 358/1.14; 347/152; 347/153; 347/138; 347/139

(58) Field of Search ................................ 395/113, 111; 358/1.1, 1.2, 1.3, 1.4, 1.5, 1.6, 1.7, 1.8, 1.9, 1.11, 1.13, 1.15, 1.16, 1.17, 1.18; 347/152, 153, 138, 139

(56) References Cited

U.S. PATENT DOCUMENTS 5,255,904 A * 10/1993 Taguchi et al. ............... 271/34
5,390,033 A * 2/1995 Bannai et al. .............. 358/400
5,477,314 A * 12/1995 Tsuchiya et al. ............ 399/107
5,584,475 A * 12/1996 Asada et al. ................ 271/121
5,918,873 A * 7/1999 Saito et al. ................. 271/121

FOREIGN PATENT DOCUMENTS

| | | |
|---|---|---|
| JP | 59-30155 | 2/1984 |
| JP | 5-92247 | 12/1993 |
| JP | 06-314048 | 11/1994 |
| JP | 07-311535 | 11/1995 |

* cited by examiner

*Primary Examiner*—Gabriel Garcia
*Assistant Examiner*—King Y. Poon
(74) *Attorney, Agent, or Firm*—Oliff & Berridge, PLC

(57) ABSTRACT

Toner and paper powder adhering to and carried by the image non-forming surface of a paper sheet in a developing unit are prevented from fixedly transferring and adhering to the inner wall of the developing unit and the inner wall of the paper sheet introduction port of a fixing unit. As a result, the paper sheet is smoothly carried from the developing unit to the fixing unit while reliably preventing a paper sheet jam. To prevent the adherence of toner and paper powder to the inner walls, first ribs are formed on the bottom surface of the top cover of the developing chamber of the processing unit and second ribs are formed on the paper sheet introduction port side of the top cover of the fixing room of the fixing unit. The first ribs and the second ribs are staggered with respect to one another. In addition, a discharging film is disposed between pairs of adjacent first ribs on the bottom surface of the top cover of the developing chamber.

31 Claims, 3 Drawing Sheets

IMAGE FORMING APPARATUS

BACKGROUND OF THE INVENTION

1. Field of Invention

The invention relates to an image forming apparatus which supplies toner to an electrostatic latent image formed on a sensitive body of a developing unit to form a toner image and transfers the toner image to a paper sheet and then heats it via a fixing unit to thermally fix the toner image and to form an image. In particular, the invention relates to an image forming apparatus which can prevent the toner, paper powder or other contaminants sticking to an image non-forming surface in the developing unit from sticking to the inner wall of the cover of the developing unit and the inner wall of a paper introduction port of the fixing unit and can smoothly transfer the paper sheet from the developing unit to the fixing unit, whereby a paper jam can be prevented with reliability.

2. Description of Related Art

Various kinds of image forming apparatuses, such as laser printers or the like, using an electrophotography method, have been proposed. The specification and drawings of a Japanese Published Patent Document No. 9-319201, for example, describes an image forming apparatus categorized broadly into a paper carrying unit, a laser scanning unit, a toner supply unit, a developing unit, a fixing unit and the like. In such an image forming apparatus, an electrostatic latent image is formed on the surface of a photosensitive drum in the developing unit, according to the image data, by the laser scanning unit and toner is supplied to the photosensitive drum by the toner supply unit to form a toner image, according to the electrostatic latent image, on the surface of the photosensitive drum, and the toner image is transferred to the paper sheet carried into the developing unit from the paper carrying unit by a transfer roller and the photosensitive drum. The paper sheet is then heated by the fixing unit to fix the toner image.

When the image is formed in this way, if the paper sheet carrying speed of the fixing unit side is set larger than the paper sheet carrying speed of the developing unit side, an image forming position on the paper sheet might be shifted. Therefore, in general, the paper carrying speed of the developing unit side is set larger than the paper sheet carrying speed of the fixing unit side. Accordingly, there is a tendency for the paper sheet to which the toner image is transferred to be carried to the fixing unit side while it makes contact with the inner, upper wall of the cover of the developing unit and that, after it makes contact with the top side of a paper sheet introduction port formed in the cover of the fixing unit, it is carried into the fixing unit.

In a conventional image forming apparatus, however, the toner, paper powder and other contaminants are dispersed in the developing unit. Therefore, while the paper sheet is carried in the developing unit, the toner and, the paper powder result in sticking to the image non-forming surface of the paper sheet, i.e., top surface of the paper sheet as transported. Moreover, since the paper sheet carrying speed of the developing unit is set larger than the paper sheet carrying speed of the fixing unit, the paper sheet is carried toward the fixing unit side while it comes into contact with the inner wall of the cover of the developing unit and, because it comes into contact with the top side of the paper sheet introduction port formed in the cover of the fixing unit, the toner and the paper powder sticking to the paper sheet stick to the inner upper wall of the cover of the developing unit and the top end portion of the paper sheet introduction port of the cover of the fixing unit.

The toner and the paper powder sticking in this way prevent the paper sheet from being smoothly carried from the developing unit to the fixing unit and, in particular, if the toner and the paper powder stick to the paper sheet introduction port of the fixing unit, there arises a problem that a paper sheet jam might occur at the paper sheet introduction port.

SUMMARY OF THE INVENTION

It is an object of the invention to overcome the above-described problems, and to prevent toner, paper powder and other contaminants, sticking to an image non-forming surface of a paper sheet in a developing unit, from sticking to the inner wall of the cover of a developing unit and the inner wall of a paper sheet introduction port. Another object of the invention is to smoothly carry the paper sheet from the developing unit to a fixing unit and to reliably prevent a paper sheet jam.

In order to accomplish the above-described objects, in an image forming apparatus according to one aspect of the invention, there is provided an image forming apparatus comprising developing means which supplies toner according to an electrostatic latent image formed on a sensitive body and forms a toner image, transfer means which is disposed opposite to the above-described sensitive body and transfers the toner image formed on the sensitive body to a paper sheet carried by a paper sheet carrying unit, and fixing means which heats and fixes the toner image transferred to the paper sheet, and further comprises a first guide member which is disposed in the downstream side of the above-described transfer means in the direction that carries the paper sheet along the carrying path of the paper sheet and which comes into contact with the lead edge of the paper sheet on which the above-described toner image is formed and directs the lead edge of the paper sheet toward the above-described fixing means, and a second guide member which is disposed in the upstream side of the above-described fixing means in the direction that carries the paper sheet along the carrying path of the paper sheet and which comes into contact with the lead edge of the paper sheet on which the above-described toner image is formed and introduces the lead edge of the paper sheet into the above-described fixing means.

In the above image forming apparatus, the paper sheet to which the toner image is transferred by the sensitive body in the developing means is carried toward the fixing means along the paper sheet carrying path while the surface of the lead edge thereof comes into contact with the first guide member. The paper sheet discharged by the developing means is introduced into the fixing means while the surface of the lead edge thereof comes into contact with the second guide member.

At this time, the toner and the paper powder dispersed in the developing means stick to the image non-forming surface of the paper sheet via the top surface of the first guide member, but the amount of such contaminants is extremely small in comparison with the amount of the toner and the paper powder when the toner and the paper powder sticking to the whole bottom surface of the cover of the developing means might stick to the paper sheet and hence there is no problem. Therefore, the toner and the paper powder scarcely stick to the apex surfaces of the first guide member and the second guide member. Accordingly, it is possible to prevent the toner and the paper powder from sticking to the inner wall of the cover of the developing means and the inner wall of the paper sheet introduction port of the fixing means and to smoothly carry the paper sheet from the developing means to the fixing means via the first guide member and the second guide member, which reliably prevents a paper sheet jam.

Moreover, the image forming apparatus is preferably characterized in that the above-described first guide member and the above-described second guide member in the above image forming apparatus are mounted plurally in the direction which intersects the carrying path of the above-described paper sheet, and that the above-described first guide member and the above-described second guide member are staggered from each other. Since a plurality of first guide members and a plurality of second guide members are staggered from each other in the image forming apparatus of the invention, they are not aligned. Therefore, even if the toner and the paper powder sticking to the apex surfaces of the first guide members stick to the paper sheet, it is possible to reliably prevent the toner and the paper powder from sticking to the second guide members. Accordingly, the toner and the paper powder never fixedly stick to the inner wall of the paper sheet introduction port of the fixing means.

Further, in the above image forming apparatus, the first carrying speed of the paper sheet expelled by the above-described developing means is set equal to or larger than the second carrying speed of the paper sheet expelled by the above-described fixing means and that, when the above-described paper sheet is carried, the lead edge of the paper sheet comes into contact with the first guide member and then comes into contact with the second guide member, and is guided into the above-described fixing means along the slant of the second guide member. In the image forming apparatus of the invention, the lead edge of the paper sheet comes into contact with the first guide member and then comes into contact with the second guide member and is then guided into the fixing means along the slant of the second guide member, as described above, based on a relationship between the first carrying speed of the developing means and the second carrying speed of the fixing means. In this respect, as described above, the paper sheet is smoothly carried from the developing means to the fixing means by the first guide member and the second guide member without sticking the toner and the paper powder to the inner wall of the cover of the developing means and the inner wall of the paper sheet introduction port of the fixing means.

Preferably, in the above image forming apparatus, a discharging film is disposed between the above-described first guide members. In the above image forming apparatus, the paper sheet is effectively discharged at the developing means side by the discharging film and hence it is possible to prevent the toner and the paper powder sticking to the paper sheet. Furthermore, the image forming apparatus is preferably characterized in that the above-described first guide member is composed of a first rib formed on the paper sheet discharge portion of the cover of the above-described developing means and that the above-described second guide member is composed of a second rib formed on the paper introduction portion of the cover of the above-described fixing means. In addition, in the image forming apparatus, the above-described transfer means is disposed above the above-described paper sheet carrying path and that the above-described first rib protrudes downward from the cover of said developing means and that the above-described second rib protrudes downward from the cover of the above-described fixing means.

In the image forming apparatus, the first rib as the first guide member can be integrally formed with the cover of the above-described developing means in a state where it protrudes downward and the second rib as the second guide member can be integrally formed with the cover of the above-described fixing means in a state where it protrudes downward.

BRIEF DESCRIPTION OF THE DRAWINGS

A preferred embodiment of the invention will be described in detail with reference to the following figures wherein.

DETAILED DESCRIPTION OF PREFERRED EMBODIMENTS

Figure 1:
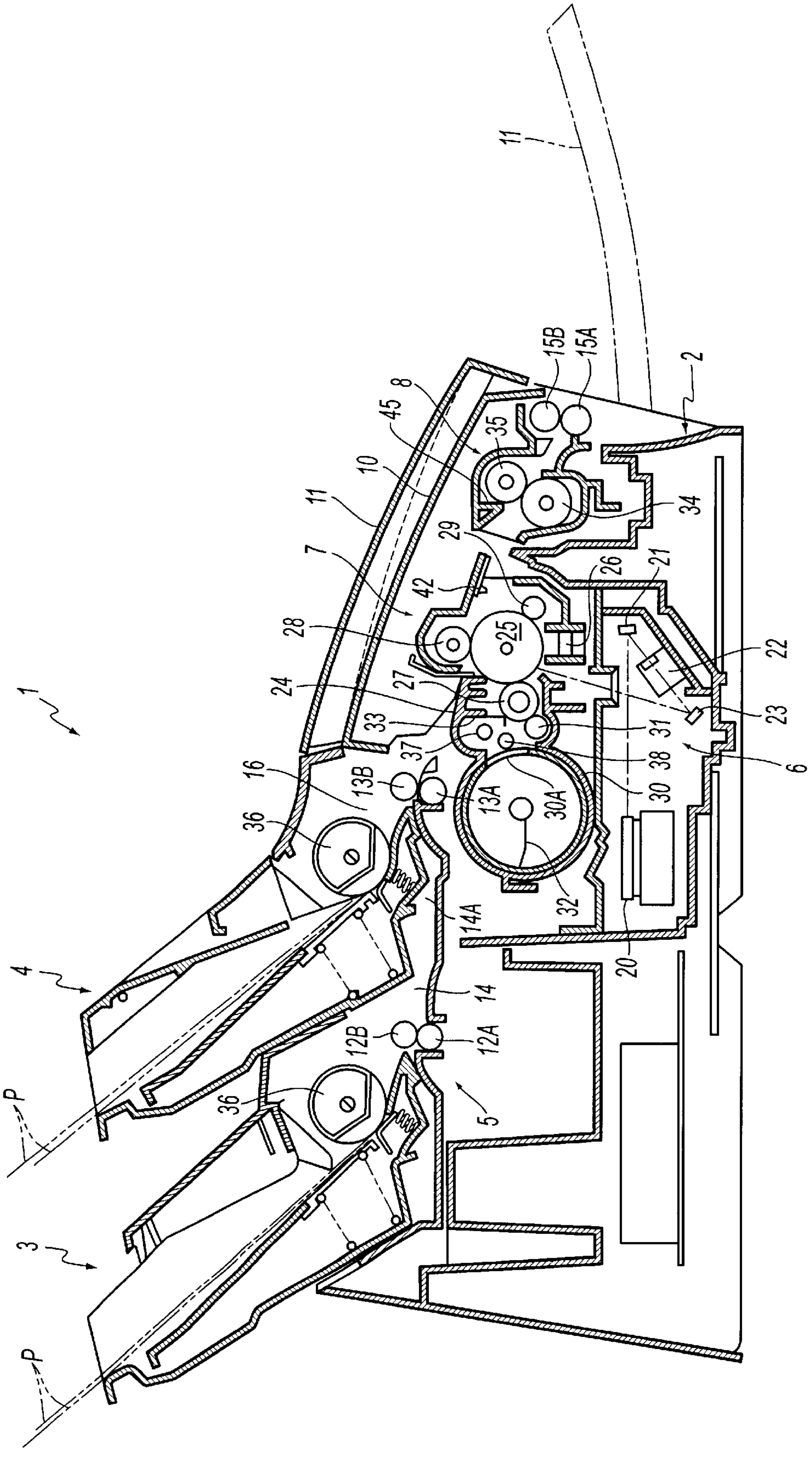
FIG. 1 is a side, sectional view of a laser printer.

An image forming apparatus according to the invention will be hereinafter described in detail with reference to the drawings of an exemplary laser printer in which the invention is embodied. Firstly, a schematic structure of the laser printer relating to the present embodiment will be described with reference to FIG. 1. FIG. 1 is a side sectional view of a laser printer.

In FIG. 1, the laser printer 1 has a body case 2, a first paper supply tray 3 mounted on the top surface side of the rear portion of the body case 2, a second paper supply tray 4, a paper sheet carrying mechanism 5 mounted in the body case 2, a scanner unit 6, a processing unit 7, a fixing unit 8, and a drive unit (not shown; received in the left end side portion of the body case 2) for driving the first and second paper supply trays 3 and 4, the paper sheet carrying mechanism 5, and the like. A top cover 10 which can open the top surface side of a printing mechanism portion and a paper discharge tray 11 are provided on the top surface side of the front portion of the body case 2. The paper discharge tray 11 is freely changed between a closed position and an open position and functions as a tray which receives a printed paper sheet at the open position.

In this respect, the scanner unit 6, the processing unit 7, and the fixing unit 8 correspond to a printing mechanism portion. The processing unit 7 has a cartridge structure that receives a photosensitive drum 25, a charging unit 26, a developing roller 27, a transfer roller 28, a cleaning roller 29 and the like in a casing 24. The casing 24 can be removably attached to a specified position in the body case 2.

The first paper supply tray 3 is fixedly mounted on the top surface of the portion near the rear end of the body case 2 and the second paper supply tray 4 is removably mounted on the top surface to the front of the first paper supply unit 3 in the body case 2. The above-described paper sheet carrying mechanism 5 carries the paper sheet P supplied selectively from the first paper supply tray 3 or the second paper supply tray 4 to the processing unit 7 and has a pair of feed rollers 12A, 12B which are mounted on the bottom end side of the first paper supply tray 3 and a pair of register rollers 13A, 13B which are mounted on the bottom end side of the second paper supply tray 4. The feed roller 12A is a drive roller and the feed roller 12B is a driven roller. The register roller 13A is a drive roller and the register roller 13B is a driven roller.

A paper sheet carrying path 14 from the first paper supply tray 3 to the register rollers 13A, 13B includes a bottom surface side carrying path 14A extending along the bottom surface of the second paper supply tray 4. The bottom surface side carrying path 14A is open to the outside when the second paper supply tray 4 is removed from the body case 2.

The paper sheet P supplied from the first paper supply tray 3, via a pickup roller 36, is sent by the pair of feed rollers 12A, 12B to the register rollers 13A, 13B through the bottom surface side carrying path 14A and is registered and then is driven and carried to the processing unit 7. The paper sheet P supplied from the second paper supply tray 4 via the pickup roller 36 is carried to the pair of register rollers 13A, 13B and is registered and then is driven and carried to the processing unit 7.

The scanner unit 6 is disposed under the processing unit 7 and has a semiconductor laser (not shown), a polygon mirror 20, reflection mirrors 21, 23, and a lens 22. A laser beam from the semiconductor laser is applied with high speed scanning to the outer peripheral portion of the photosensitive drum 25 which is charged and rotating, as shown by a chain line, via the polygon mirror 20, the reflection mirror 21, the lens 22 and the reflection mirror 23, whereby an electrostatic latent image is formed on the surface of the photosensitive drum 25 that is exposed by the laser beam.

The processing unit 7 houses, in the casing 24, the photosensitive drum 25, a scorotron-type charging unit 26, a developing roller 27, a transfer roller 28, a cleaning roller 29, a toner box 30, and a toner supply roller 31. The toner box 30 can be attached to and removed from the processing unit 7 in a state in which the processing unit 7 is removed from the body case 2. The toner in the toner box 30 is stirred by a stirring member 32 and is discharged from an opening 30A of the toner box 30 and then is supplied to the developing roller 27 via the toner supply roller 31. The supplied toner is made a toner layer of a specified thickness by a blade 33 on the developing roller 27 and is supplied to the photosensitive drum 25. Moreover, two auger members 37, 38 are arranged near the opening 30A of the toner box 30 and each of the auger members 37, 38 has an action of uniformly dispersing the toner discharged from the opening 30A in the casing 24.

The electrostatic latent image formed on the surface of the photosensitive drum 25 is made a visible image by transferring toner held on the developing roller 27 thereto and the toner image is then transferred to the paper sheet P when the paper sheet is passed between the photosensitive drum 25 and the transfer roller 28. The paper sheet P is sent into the fixing unit 8 where the toner is fixed to the paper sheet. Moreover, the toner remaining on the surface of the photosensitive drum 25 is temporarily collected by the cleaning roller 29 and then is collected by the developing roller 27 via the photosensitive drum 25 at a specified timing. The fixing unit 8 thermally fixes the toner on the paper sheet and has a heating roller 34, a pressing roller 35 pressing the heating roller 34 and a pair of discharge rollers 15A, 15B which are mounted on the downstream side of the rollers 34, 35 and discharge the paper to the outside of the body case 2.

In addition, the carrying speed at which the paper sheet P is transported by the photosensitive drum 25 and the transfer roller 28 of the processing unit 7 is set equal to or larger than the carrying speed at which the paper sheet P is transported by the heating roller 34, the pressing roller 35, and discharge rollers 15A, 15B of the fixing unit 8. This is because, if the carrying speed at which the paper sheet P is transported by the heating roller 34, the pressing roller 35, and discharge rollers 15A, 15B is larger than the carrying speed at which the paper sheet P is transported by the photosensitive drum 25 and the transfer roller 28, the paper sheet P is pulled at a point where the toner image is transferred to the paper sheet P from the photosensitive drum 25, in other words, at a nip point between the photosensitive drum 25 and the transfer roller 28, to cause a displacement in the position of the image formed on the paper sheet P, which might produce a disturbed image.

Figure 2:
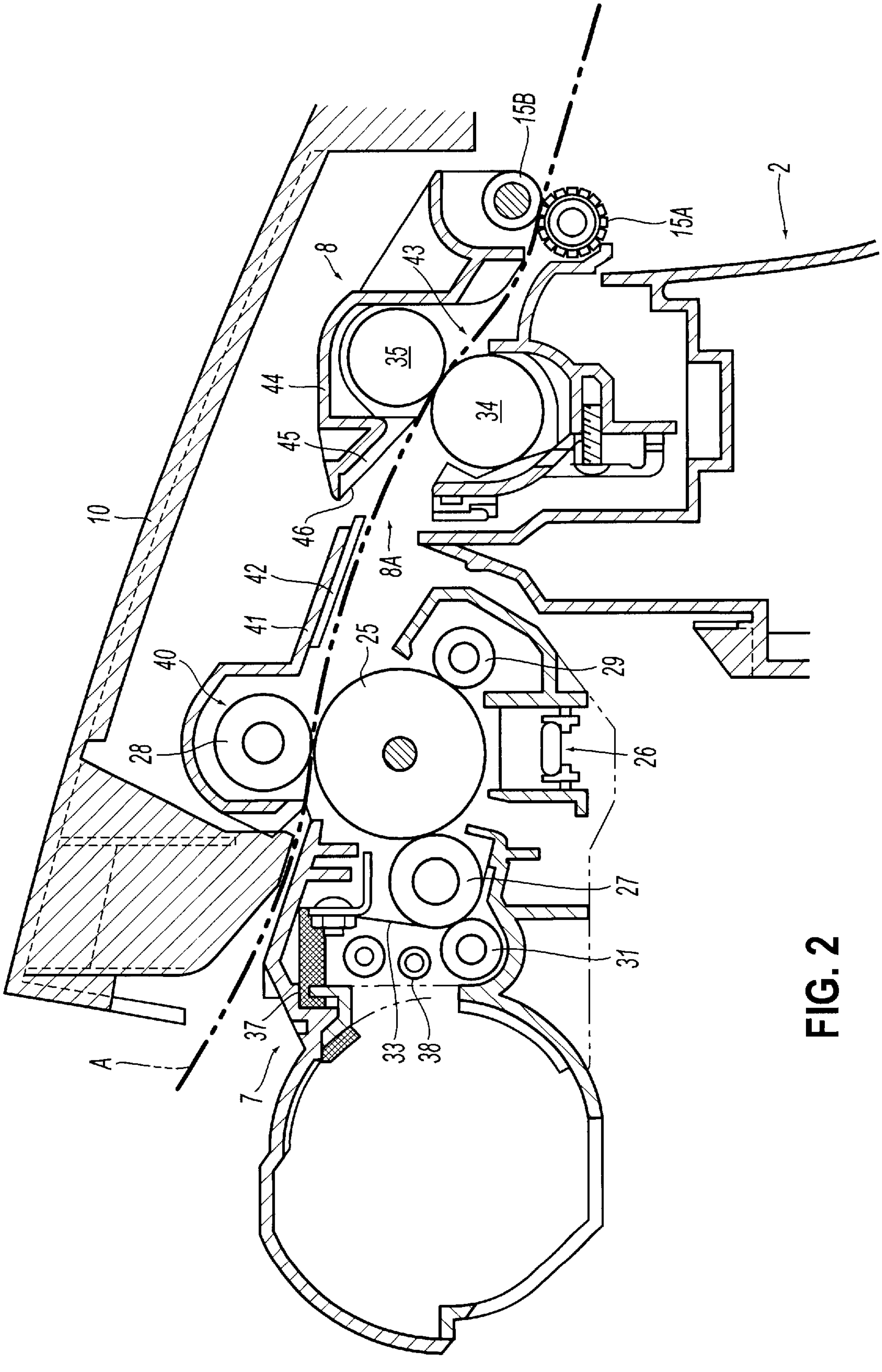
FIG. 2 is a side, sectional view, on an enlarged scale, of a processing unit and a fixing unit.

Next, the structure of the processing unit 7 and the fixing unit 8 will be described in detail based on FIG. 2. FIG. 2 is an enlarged side sectional view of the processing unit 7 and the fixing unit 8.

A plurality of parallel first ribs 42 arrayed along the length of the photosensitive drum 25 and the transfer roller 28 and extending in a direction of movement are formed on the bottom surface of a top cover 41 composing the developing chamber 40 of the processing unit 7 on the downstream side of the photosensitive drum 25 along the carrying path A of the paper sheet P (designated by a chain double-dotted line).

In this respect, the first ribs 42 smoothly guide the paper sheet P transported by the photosensitive drum 25 and the transfer roller 28 toward the fixing unit 8 without permitting the paper sheet P to contact the entire width of the bottom surface of the top cover 41. Moreover, each of the first ribs 42 has an arc shaped end at the upstream side of the carrying path A. As a result, the lead edge of the paper sheet P can be smoothly guided along the apex surface (bottom surface) of the first ribs 42 via the arc-like portion.

In this respect, some toner and paper powder contaminants are dispersed in the developing chamber 40 and stick to the apex surfaces of the first ribs 42. As described above, when the paper sheet P is transported, the toner and the paper powder sticking to the apex surfaces of the first ribs 42 may attach to the image non-forming surface of the paper sheet P ( the top surface of the paper sheet P in FIG. 2) but the amount of such contaminants so adhered is extremely small in comparison with the amount of the toner and the paper powder contaminants that may adhere to the entire bottom surface of the top cover 41 and subsequently be transferred to the paper sheet. The small amount of contaminants transferred between the first ribs 42 and the paper sheet P does not present a problem.

Moreover, a plurality of parallel second ribs 45 which slant downward with respect to the carrying path A of the paper sheet P, that is, as shown in FIG. 2, slant downward from the upstream side to the downstream side along the carrying path A, and are also arrayed in the direction of the length of the photosensitive drum 25 and the transfer roller 28 are formed at the top end portion in the upstream side of the top cover 44 which composes the fixing room 43 of the fixing unit 8 and is adjacent to the top cover 41 of the developing chamber 40. The second ribs 45 have a slant surface 46.

The lead edge of the paper sheet P, after passing along the first ribs 42, comes into contact with the slant surfaces 46 of the second ribs 45 and is guided downward along the slant surfaces 46, whereby the paper sheet P is carried into the fixing room 43 of the fixing unit 8.

Figure 3:
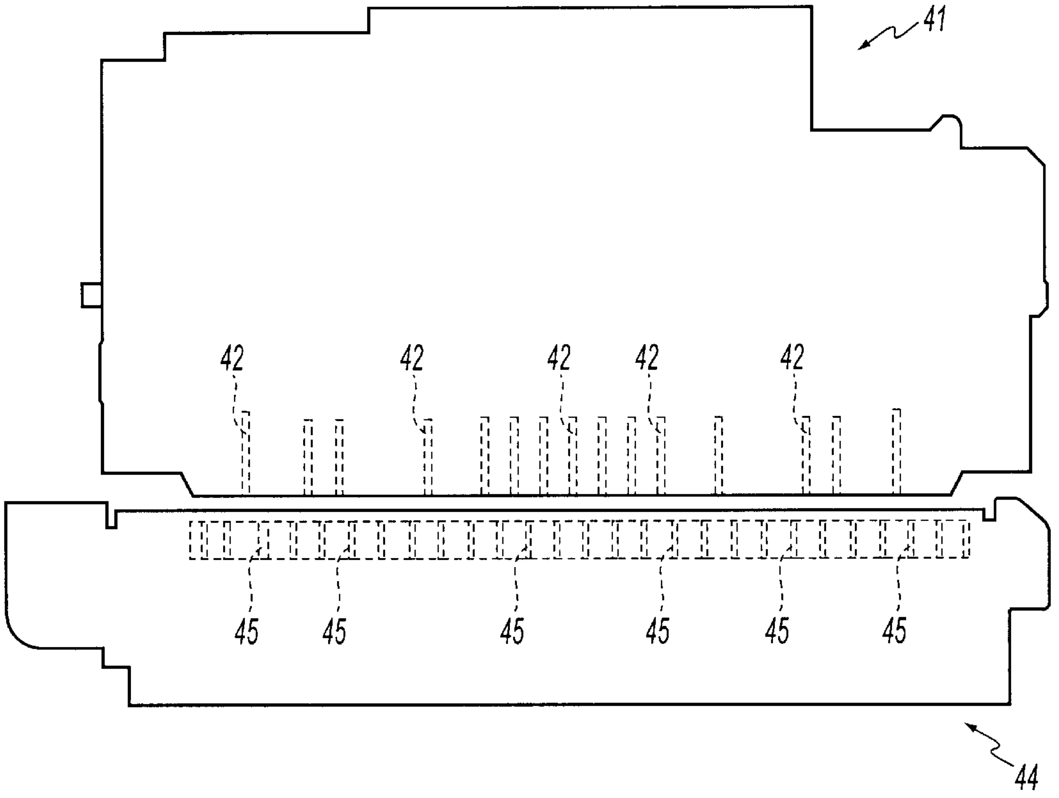
FIG. 3 is a plan view of a processing unit and a fixing unit.

Next, a relationship of the positions of the first ribs 42 relative to the second ribs 45 will be described with reference to FIG. 3. FIG. 3 is a plan view of the processing unit 7 and the fixing unit 8.

The plurality of first ribs 42 are formed on the bottom surface of the top cover 41, composing the developing chamber 40 of the processing unit 7, and arrayed across the width of the top cover 41 (in the right and left directions in FIG. 3). The plurality of second ribs 45 are formed on the bottom surface of the upper cover 44, composing the fixing room 43 of the fixing unit 8, and arrayed across the width of the top cover 44 (in the right and left directions in FIG. 3).

In this regard, as is shown in FIG. 3, each of the first ribs 42 and each of the second ribs 45 are staggered or offset from each other such that they are not aligned. As shown, the first ribs 42 and the second ribs 45 are positioned such that each of the first ribs 42 is disposed between a pair of the second ribs 45. Such a staggered arrangement of the first ribs 42 and the second ribs 45 is for the following reason. Because the toner and the paper powder are dispersed in the developing chamber 40, the toner and the paper powder adhere to the apex surface of each of the first ribs 42. The toner and the paper powder adhered to each of the first ribs 42 transfers to the image non-forming surface (top surface) of the paper sheet P and are carried to the second ribs 45. However, since the first ribs 42 and the second ribs 45 are staggered, or non-aligned, with each other, the toner and the paper powder adhered to the apex surface of each of the first ribs 42 is never carried or transferred to the second ribs 45. Therefore, the toner and the paper powder are prevented from adhering to the second ribs 45, which prevents the toner and the paper powder from adhering to the upper portion of the paper sheet introduction port 8A of the fixing unit 8.

Figure 4:
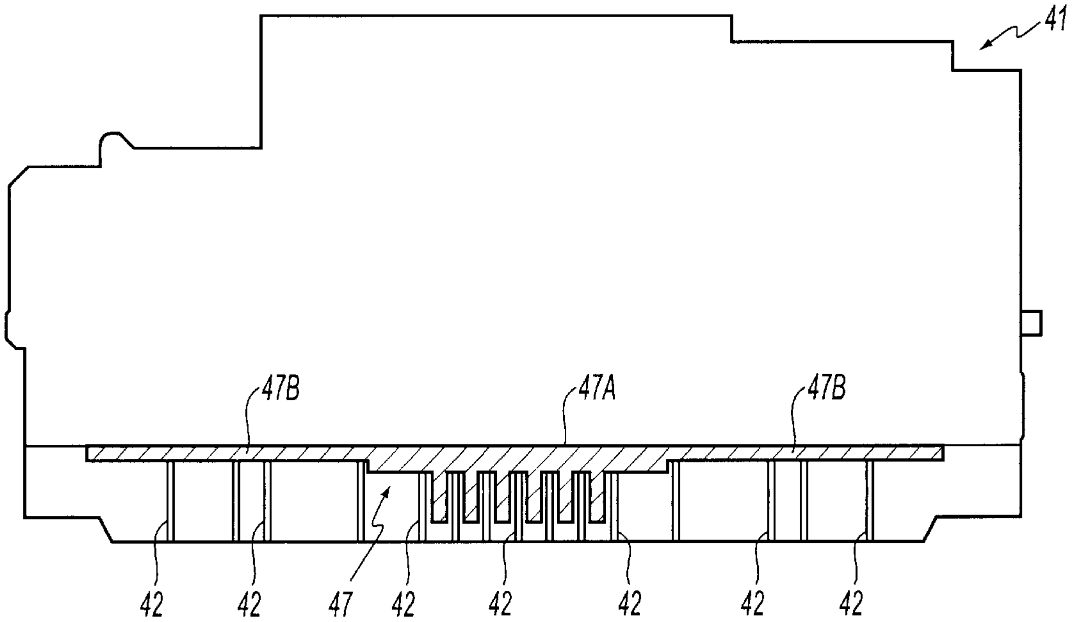
FIG. 4 is a bottom view of an upper cover of a developing chamber.

Moreover, a discharging film 47 is disposed between many of the first ribs 42 on the bottom surface of the top cover 41 of the developing chamber 40. The discharging film 47 is a PET film with an aluminum surface coating and is 0.3 mm thick. The shape and use of the discharging film 47 will be described with reference to FIG. 4. FIG. 4 is a bottom view of the top cover 41 of the developing chamber 40, i.e., a plan view of the top cover turned over so the bottom surface is up.

In FIG. 4, the discharging film 47 has a comb-like portion 47A in the center thereof and extending portions 47B on both sides of the comb-like portion 47A. The comb-like portion 47A is disposed between adjacent pairs of the first ribs 42 and the extending portions 47B overlap onto the base portion of each of the first ribs 42. The discharging film 47 having such a structure discharges electrical charges on the paper sheet P on which the toner image is formed at the image-formed surface (bottom surface) in the developing chamber 40 when the paper sheet P is transported to the fixing unit side 8, which can prevent effectively the toner and the paper powder dispersed in the developing chamber 40 from sticking to the image non-forming surface (top surface).

The action of the laser printer 1 having the above-described structure will be described.

The paper sheet P supplied by the first paper tray 3 or the second paper tray 4 is carried into the processing unit 7 via the feed rollers 12A, 12B and/or the register rollers 13A, 13B. Moreover, in the processing unit 7, the toner is supplied from the toner box 30 via the toner supply roller 31 and the developing roller 27 to the electrostatic latent image formed on the photosensitive drum 25 via the scanning unit 6 based on the image data, whereby the toner image is formed on the surface of the photosensitive drum 25.

Further, the paper sheet P carried into the processing unit 7 is nipped and transported between the photosensitive drum 25 and the transfer roller 28 and, while the paper sheet P is transported, the toner image formed on the photosensitive drum 25 is transferred to the image-forming surface (bottom surface) of the paper sheet P. The paper sheet P is transported to the downstream side along the carrying path A. In this respect, since the carrying speed at which the paper sheet P is transported by the photosensitive drum 25 and the transfer roller 28 of the processing unit 7 is set equal to or greater than the speed at which the paper sheet P is transported by the heating roller 34, the pressing roller 35 and discharge rollers 15A, 15B of the fixing unit 8, the lead edge of the paper sheet P is firstly put into contact with the arc portions of the first ribs 42 on the bottom surface of the cover 41 and then is transported while it is in contact with the surfaces of the first ribs 42 via the arc portions thereof.

Because some toner and paper powder are dispersed in the developing chamber 40, the toner and the paper powder sticking to the top surfaces of the first ribs 42 adhere to the image non-forming surface (top surface) of the paper sheet P. However, because the paper sheet P is effectively discharged by the discharging film 47, the amount of adhered toner and the paper powder is very small.

Then, the lead edge of the paper sheet P comes into contact with the slanting surfaces 46 of the second ribs 45 formed on the top cover 44 of the fixing room 43 and is guided downward along the slanting surfaces 46 to the nip of the heating roller 34 and the pressing roller 35. As the first ribs 42 and the second ribs 45 are staggered or offset from each other, that is, they are not aligned, the toner and the paper powder adhering to the surfaces of the first ribs 42 are not carried and adhered to the second ribs 45. Therefore, the toner and the paper powder can be prevented from adhering to the second ribs 45. This prevents the toner and the paper powder from adhering to the top potion of the paper sheet introduction port 8A of the fixing unit 8. Accordingly, the toner and the paper powder are prevented from adhering to the inner wall of the top cover 41 of the developing chamber 40 and the top portion of the paper sheet introduction port 8A of the fixing room 43 and hence the paper sheet P can be smoothly carried from the developing chamber 40 to the fixing room 43 along the first ribs 42 and the second ribs 45, which can reliably prevent a paper sheet jam.

In addition, the toner image transferred to the paper sheet P is heated and fixed by the heating roller 34 and the pressing roller 35 in cooperation and then the paper sheet P is discharged to the outside by the discharge rollers 15A, 15B.

As described above in detail, in the laser printer 1 of the invention, the first ribs 42 are formed on the bottom surface of the top cover 41, composing the developing chamber 40 of the processing unit 7, and the second ribs 45 are formed on the paper sheet introduction port 8A side of the top cover 44, composing the fixing room 43 of the fixing unit 8. Moreover, as the first ribs 42 and the second ribs 45 are staggered from each other, the toner and the paper powder adhered to the surfaces of the first ribs 42 are not transferred or adhered to the second ribs 45. This prevents the toner and the paper powder from adhering to and building up on the top portion of the paper sheet introduction port 8A of the fixing unit 8. Therefore, the toner and the paper powder are prevented from adhering to the inner wall of the top cover 41 of the developing chamber 40 and the top portion of the paper sheet introduction port 8A of the fixing room 43 permitting a smoothly carried paper sheet P from the developing chamber 40 to the fixing room 43 by the cooperation of the first ribs 42 and the second ribs 45, reliably preventing a paper sheet jam.

Moreover, as the discharging film 47 is disposed between many of the first ribs 42 on the bottom surface of the top cover 41 of the developing chamber 40, it can effectively prevent the toner and the paper powder dispersed in the developing chamber 40 from sticking to the image non-forming surface of the paper sheet P.

Further, although the invention has been described in conjunction with a preferred embodiment thereof, it will be understood that it is not intended to limit the invention to the embodiment. On the contrary, it is intended to cover all such alternatives, modifications, and variations that fall within the spirit and scope of the invention as defined by the appended claims. For example, although the preferred embodiment has a structure that the transfer roller 28 is disposed above the photosensitive drum 25 in the processing unit 7 and that the first ribs 42 and the second ribs 45 are disposed above the carrying path A of the paper sheet P, it is not intended to limit the invention to that structure. A structure may be used such that the photosensitive drum 25 is disposed above the transfer roller 28. and the first ribs 42 and the second ribs 45 are disposed below the carrying path A.

In addition, although the invention uses a photosensitive drum 25, instead of the photosensitive drum 25, a sensitive body of an endless belt type, for example, may be used.

What is claimed is:

1. A smooth print medium feed mechanism, for a printing device having a developing chamber, containing a sensitive member and opposing transfer roller, with a covering surface and a fixing chamber, containing a heating roller and an opposing pressing roller, having an entry port, the print medium feed mechanism comprising:

- a plurality of first guide members extending into the developing chamber from the covering surface; and
- a plurality of second guide members extending from a surface of the entry port into the entry port on the same side of a print medium feed path as the plurality of first guide members, the plurality of first guide members extending from the covering surface spaced apart from one another along a longitudinal axis of the transfer roller and the plurality of second guide members extending from the surface of the entry port and spaced apart from one another along a longitudinal axis of the heating roller, the plurality of first guide members and the plurality of second guide members offset from one another such that no first guide member is aligned with a second guide member.

2. The smooth print medium feed mechanism according to claim 1, wherein each first guide member is a rib extending parallel to a direction of movement of a print medium along the print medium feed path.

3. The smooth print medium feed mechanism according to claim 2, wherein each rib shaped first guide member has a rounded upstream end with respect to the print medium feed path.

4. The smooth print medium feed mechanism according to claim 2, further comprising a discharging film mounted to the covering surface upstream of the plurality of first guide members.

5. The smooth print medium feed mechanism according to claim 4, wherein the discharging film has a central comb-like portion and an extending portion on each side of the comb-like portion.

6. The smooth print medium feed mechanism according to claim 5, wherein teeth of the comb-like portion extend between adjacent pairs of first guide members.

7. The smooth print medium feed mechanism according to claim 1, wherein each second guide member is a rib extending parallel to a direction of movement of a print medium along the print medium feed path.

8. The smooth print medium feed mechanism according to claim 7, wherein a surface of each rib guides the print medium to a nip of heating roller and the pressing roller.

9. The smooth print medium feed mechanism according to claim 8, wherein a upstream end of each rib of the plurality of second guide members is further from the print medium guide path than is a downstream end of the rib.

10. The smooth print medium feed mechanism according to claim 7, wherein a transport speed imparted to the print medium by the sensitive member-transfer roller is greater than a transport speed imparted to the print medium by the heating roller-pressing roller.

11. An image forming apparatus, comprising:

- a sensitive body on which a toner image is formed;
- a transfer device, disposed opposite to the sensitive body, that transfers the toner image to a sheet;
- a transfer device cover which covers the transfer device, the cover including a downstream portion on which the sheet is fed from the transfer device; and
- a plurality of first guide members disposed at the downstream portion of the transfer device cover.

12. The image forming apparatus as claimed in claim 11, further comprising:

- a developing mechanism which supplies toner to the photosensitive body to form the toner image; and
- a fixing device that heats and fixes the toner image on the sheet.

13. The image forming apparatus as claimed in claim 12, further comprising:

- a fixing device cover which covers the fixing device, the fixing device cover including a upstream portion on which the sheet is fed from the downstream portion of the transfer device cover; and
- a plurality of the second guide members disposed at the upstream portion of the fixing device cover.

14. The image forming apparatus as claimed in claim 13, wherein two or more of the first guide members and two or more of the second guide members are arrayed transverse to and extend along the direction of movement of the sheet and the first guide members and the second guide members are staggered from each other.

15. The image forming apparatus as claimed in claim 13, wherein a first carrying speed of the sheet transported by the developing mechanism is set equal to or larger than a second carrying speed of the sheet transported by the fixing device, wherein, when the sheet is transported, the lead edge of the sheet first contacts the first guide members and then contacts the second guide members and is guided into the fixing device along a slant of the second guide members.

16. The image forming apparatus as claimed in claim 13, wherein a discharging film is disposed between at least one pair of adjacent first guide members.

17. The image forming apparatus as claimed in claim 13, wherein each first guide member comprises a rib formed on a paper discharge portion of a cover of the developing mechanism and each second guide member comprises a rib formed on a sheet introduction portion of a cover of the fixing device.

18. The image forming apparatus as claimed in claim 17, wherein the transfer device is located in the upstream portion of the direction of movement of the sheet, and the rib of the first guide member protrudes downward from the cover of the developing mechanism and the rib of the second guide member protrudes downward from the cover of the fixing device.

19. The image forming apparatus as claimed in claim 14, wherein a first carrying speed of the sheet transported by the developing mechanism is set equal to or larger than a second carrying speed of the sheet transported by the fixing device, wherein, when the sheet is transported, the lead edge of the sheet first contacts the first guide members and then contacts the second guide members and is guided into the fixing device along a slant of the second guide members.

20. The image forming apparatus as claimed in claim 14, wherein a discharging film is disposed between at least one pair of adjacent first guide members.

21. The image forming apparatus as claimed in claim 15, wherein a discharging film is disposed between at least one pair of adjacent first guide members.

22. The image forming apparatus as claimed in claim 14, wherein each first guide member comprises a rib formed on a paper discharge portion of a cover of the developing mechanism and each second guide member comprises a rib formed on a paper introduction portion of a cover of the fixing device.

23. The image forming apparatus as claimed in claim 15, wherein each first guide member comprises a rib formed on a paper discharge portion of a cover of the developing mechanism and each second guide member comprises a rib formed on a paper introduction portion of a cover of the fixing device.

24. The image forming apparatus as claimed in claim 16, wherein each first guide member comprises a rib formed on a paper discharge portion of a cover of the developing mechanism and each second guide member comprises a rib formed on a paper introduction portion of a cover of the fixing device.

25. The image forming apparatus as claimed in claim 22, wherein the transfer device is located in the upstream portion of the direction of movement of the sheet, and the rib of the first guide member protrudes downward from the cover of the developing mechanism and the rib of the second guide member protrudes downward from the cover of the fixing device.

26. The image forming apparatus as claimed in claim 23, wherein the transfer device is located in the upstream portion of the direction of movement of the sheet, and the rib of the first guide member protrudes downward from the cover of the developing mechanism and the rib of the second guide member protrudes downward from the cover of the fixing device.

27. The image forming apparatus as claimed in claim 24, wherein the transfer device is located in the upstream portion of the direction of movement of the sheet, and the rib of the first guide member protrudes downward from the cover of the developing mechanism and the rib of the second guide member protrudes downward from the cover of the fixing device.

28. A process unit for an image forming apparatus, comprising:

a photosensitive member;

a transfer member, disposed opposite to the photosensitive member, that transfers the toner to a sheet;

a case that accommodates the photosensitive member and the transfer member, the case including an inlet and an outlet so that the sheet is fed from the inlet to the outlet through the transfer member; and a plurality of guide members disposed at the case adjacent to the outlet, the plurality of the guide members being contacted by a non-image surface of the sheet.

29. The process unit according to claim 28, further comprising a discharging film disposed between at least one pair of adjacent first guide members.

30. The process unit according to claim 28, further comprising a developing member that supplies toner to the photosensitive member, wherein the case further accommodates the developing member.

31. The process unit according to claim 30, further comprising a discharging film disposed between at least one pair of adjacent first guide members.

* * * * *